US007304765B2

United States Patent
Ohnishi

(10) Patent No.: US 7,304,765 B2
(45) Date of Patent: Dec. 4, 2007

(54) TRANSMITTER APPARATUS AND METHOD FOR SELECTIVELY CONVERTING AND TRANSMITTING STILL IMAGE FILES IN REQUESTED FORMAT

(75) Inventor: Shinji Ohnishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 769 days.

(21) Appl. No.: 10/320,483

(22) Filed: Dec. 17, 2002

(65) Prior Publication Data

US 2003/0133024 A1 Jul. 17, 2003

(30) Foreign Application Priority Data

Jan. 15, 2002 (JP) .............. 2002-006804

(51) Int. Cl.
*G06F 15/00* (2006.01)
(52) U.S. Cl. .............. 358/1.2; 348/231.99; 348/207.1; 348/207.11
(58) Field of Classification Search .............. 358/1.2; 348/231.99, 207.1, 207.11
See application file for complete search history.

(56) References Cited

U.S. PATENT DOCUMENTS

| 5,960,154 A | * | 9/1999 | Ohnishi et al. ............. 386/117 |
| 6,825,876 B1 | * | 11/2004 | Easwar et al. .............. 348/234 |
| 6,885,395 B1 | * | 4/2005 | Rabbani et al. ........... 348/231.1 |
| 6,933,970 B2 | * | 8/2005 | Koshiba et al. .............. 348/273 |
| 7,031,965 B1 | * | 4/2006 | Moriya et al. ................ 707/10 |

FOREIGN PATENT DOCUMENTS

| JP | 07-271702 | 10/1995 |
| JP | 7-288639 | 10/1995 |
| JP | 10-108006 | 4/1998 |
| JP | 10-233880 | 9/1998 |
| JP | 2001-249667 | 9/2001 |
| WO | 97/50243 | 12/1997 |

* cited by examiner

*Primary Examiner*—Twyler Lamb
*Assistant Examiner*—Benjamin Dulaney
(74) *Attorney, Agent, or Firm*—Fitzpatrick, Cella, Harper & Scinto

(57) ABSTRACT

An imaging device for transmitting a still image file includes an interface unit and a conversion unit. The interface unit receives, from an external device via a connection between the imaging device and the external device, a control command including first data designating a still image file to be transmitted, second data designating a file type, and third data designating a resolution. The conversion unit converts the still image file designated by the first data into a still image file having the resolution designated by the third data if the file type designated by the second data is a predetermined file type. If the file type designated by the second data is not the predetermined file type, the interface unit transmits, to the external device via the connection between the imaging device and the external device, the still image file at its original resolution.

16 Claims, 5 Drawing Sheets

FIG. 2

| | COMMAND FORMAT | | | RESPONSE FORMAT | |
|---|---|---|---|---|---|
| | msb | lsb | msb | | lsb |
| opcode | SEND FILE (50₁₆) | | | <= | |
| operand [0] | subfunction | | | <= | |
| operand [1] | FF₁₆ | | | result | |
| operand [2] | physical_volume_number | | | <= | |
| operand [3] | logical_volume_number | | | <= | |
| operand [4] | media_generation_count | | | media_generation_count | |
| operand [5] | FF₁₆ | | | <= | |
| operand [6] | FF₁₆ | | | <= | |
| operand [7] | FF₁₆ | | | <= | |
| operand [8] | FF₁₆ | | | <= | |
| operand [9] | source_plug | | | <= | |
| operand [10] | file_type | | | <= | |
| operand [11] | scalability_type | scalability_value | | <= | |
| operand [12] | file_path_length | | | <= | |
| operand [13] | file_path | | | <= | |
| .. | | | | | |
| .. | | | | | |

FIG. 3

| file_type | VALUE | MEANING |
|---|---|---|
| unspecified | $00_{16}$ | FILE TYPE NOT SPECIFIED |
| JPEG2000 | $01_{16}$ | JPEG 2000 FORMAT |
| --- | OTHER VALUE | RESERVED FOR FUTURE USE |

FIG. 4

| scalability_type | VALUE | MEANING |
|---|---|---|
| resolution | $0_{16}$ | resolution scalability |
| quality | $1_{16}$ | quality scalability |
| --- | OTHER VALUE | RESERVED FOR FUTURE USE |

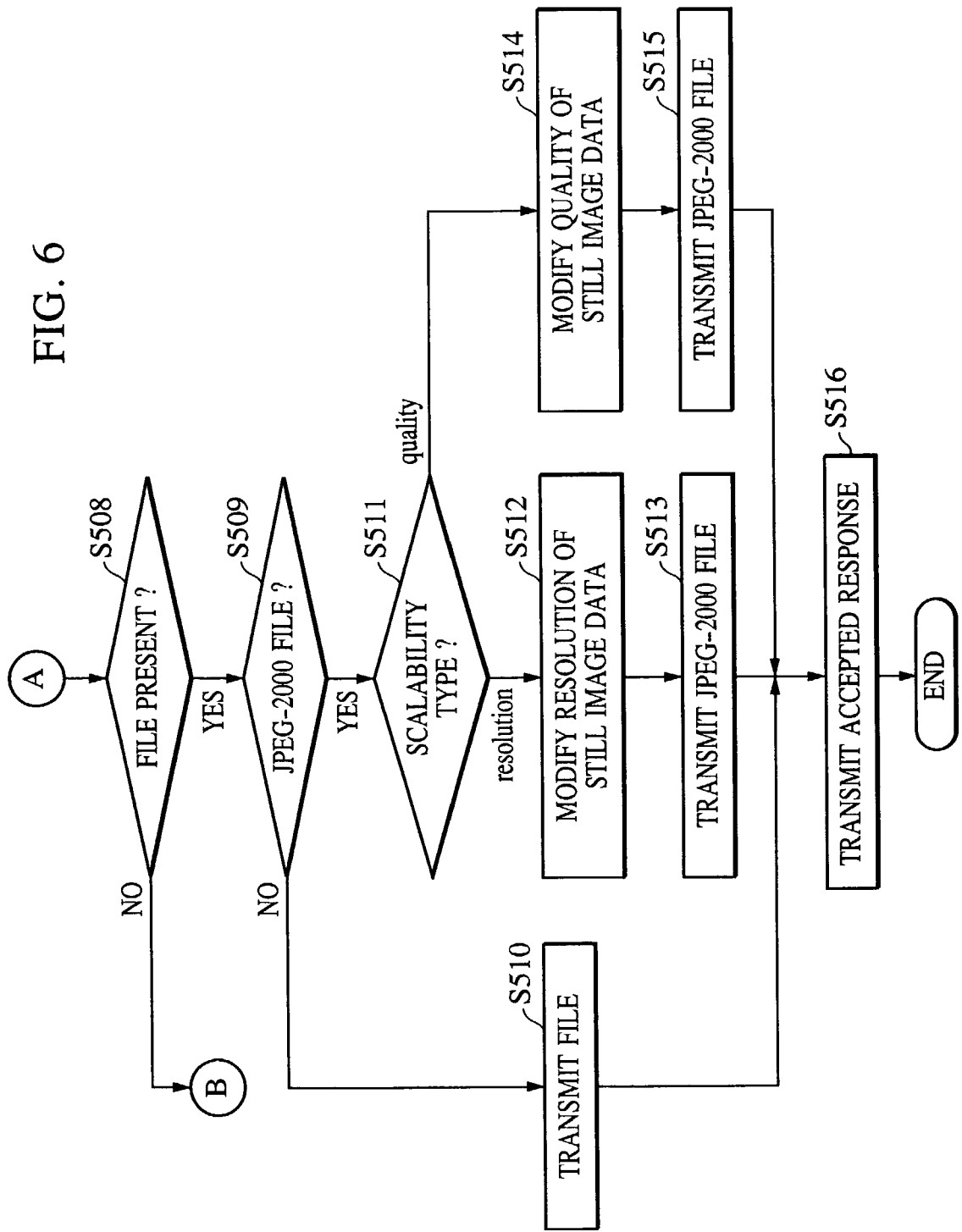

TRANSMITTER APPARATUS AND METHOD FOR SELECTIVELY CONVERTING AND TRANSMITTING STILL IMAGE FILES IN REQUESTED FORMAT

BACKGROUND OF THE INVENTION

1. Field of the Invention

The present invention generally relates to an apparatus and method for transmitting a still image file, and more particularly to a transmitter apparatus and method for selectively converting and transmitting a still image file in a desired format compatible with a control command received from an external apparatus.

2. Description of the Related Art

Technical standards which cover techniques of transmitting a still image file or a moving image file stored in removable media in a digital video camera to an external device such as a personal computer have been proposed.

One such standard is the AV/C Camera Storage Subunit 1.0 formulated by the 1394 Trade Association, which is a standardization organization related to the IEEE 1394 standards.

The basic specifications of the AV/C Camera Storage Subunit 1.0 are detailed in TA document 1999036, AV/C Camera Storage Subunit 1.0.

The AV/C Camera Storage Subunit 1.0 has a drawback in that an external apparatus cannot request that a still image file be transmitted with a modified or converted resolution or image quality.

A still image file complying with the JPEG-2000 standard (hereinafter referred to as a JPEG-2000 file) featuring a resolution progressive function or an image quality progressive function thus is not effectively used.

In addition to the JPEG-2000 file, a still image featuring a resolution progressive function or the image quality progressive function defined by the JPEG-2000 standard suffers from this drawback.

SUMMARY OF THE INVENTION

An object of the present invention is to overcome the above-described drawbacks.

It is another object of the present invention to provide a method and apparatus for transmitting a still image file having a modified or converted resolution or image quality requested by an external device.

In one aspect, the present invention relates to a transmitter apparatus including a receiver which receives a control command including first data designating a still image file to be transmitted, second data designating a type of the still image file to be transmitted, and third data designating a resolution at which the still image file is to be transmitted, a converter which converts a resolution of the still image file designated by the first data in accordance with the third data, and a transmitter which transmits the still image file having the resolution converted by the converter.

In another aspect, the present invention relates to a transmitter apparatus including a receiver which receives a control command including first data designating a still image file to be transmitted, second data designating a type of the still image file to be transmitted, and third data designating an image quality at which the still image file is to be transmitted, a converter which converts an image quality of the still image file designated by the first data in accordance with the third data, and a transmitter which transmits the still image file having the image quality converted by the converter.

In yet another aspect, the present invention relates to a transmission method including the steps of receiving a control command including first data designating a still image file to be transmitted, second data designating a type of the still image file to be transmitted, and third data designating a resolution at which the still image file is to be transmitted, converting a resolution of the still image file designated by the first data in the receiving step in accordance with the third data, and transmitting the still image file having the resolution converted in the converting step.

In still another aspect, the present invention relates to a transmission method including the steps of receiving a control command including first data designating a still image file to be transmitted, second data designating a type of the still image file to be transmitted, and third data designating an image quality at which the still image file is to be transmitted, converting an image quality of the still image file designated by the first data in the receiving step in accordance with the third data, and transmitting the still image file having the image quality converted in the converting step.

Still other objects, features and advantages of the present invention will become fully apparent from the following detailed description of the preferred embodiments.

BRIEF DESCRIPTION OF THE DRAWINGS

FIG. 2 shows command formats of SEND FILE control commands and response formats responsive thereto;

FIG. 3 shows file types;

FIG. 4 shows scalability types;

FIG. 6 is a continuation of the flow diagram of FIG. 5.

DESCRIPTION OF THE PREFERRED EMBODIMENTS

Preferred embodiments of the present invention are discussed below with reference to the drawings.

Figure 1:
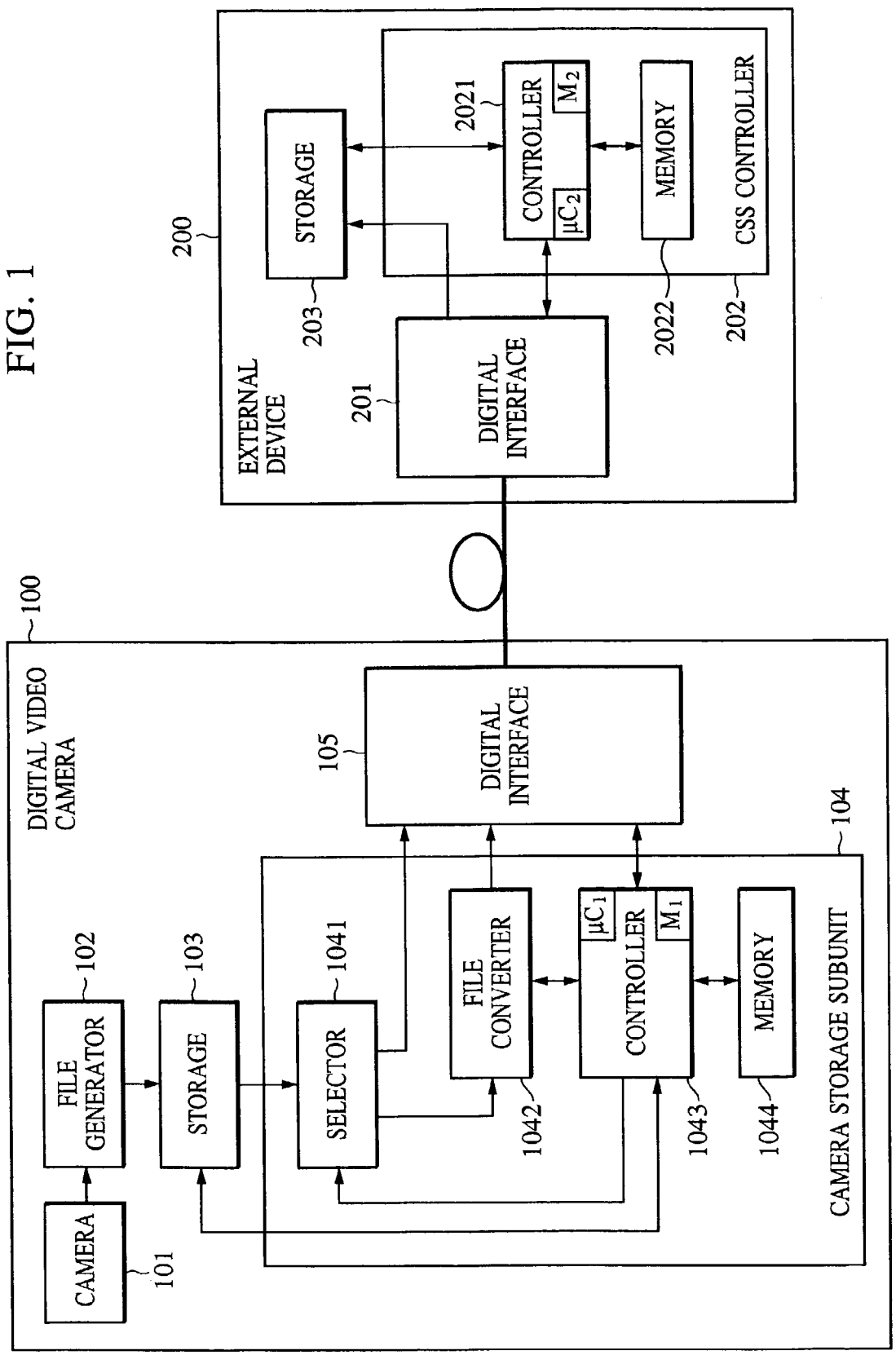
FIG. 1 is a block diagram showing a major portion of a digital video camera and an external device in accordance with one embodiment of the present invention.

FIG. 1 is a block diagram illustrating major portions of a digital video camera 100 and an external device 200 that requests the digital video camera 100 to send a still image having a desired resolution or a desired image quality. Each of the block elements shown in the block diagram illustrates general structures, conventional embodiments of which are well known to those skilled in the art, unless otherwise described below.

The digital video camera 100 includes a camera 101, a file generator 102, a storage 103, a camera storage subunit 104 and a digital interface 105; the camera storage subunit 104 includes a selector 1041, a file converter 1042, a controller 1043 and a memory 1044.

The external device 200 includes a digital interface 201, a CSS (camera storage subunit) controller 202 for remote controlling the camera storage subunit 104, and a storage 203; the controller 202 includes a controller 2021 and a memory 2022.

The camera 101 includes a lens, an image pickup device, such as a CCD, an A/D converter, etc.; the camera 101 constitutes an imaging device that captures a still image or a moving image of an object and generates still image data or moving image data. Still image data or moving image data generated by the camera 101 is fed to the file generator 102.

The file generator 102 generates a still image file in a predetermined format (such as the JPEG or any JPEG-2000 format) in accordance with the still image data and any additional data attached thereto, which may be generated by the camera 101. The still image file generated by the file generator 102 is stored in the storage 103. In accordance with the moving image data and any additional data attached thereto generated by the camera 101, the file generator 102 generates a moving image file in a predetermined format (such as the MPEG or MPEG-2000 format). The moving image file generated by the file generator 102 is stored in the storage 103.

In addition to functions defined in the AV/C Camera Storage Subunit 1.0 standard, the camera storage subunit 104 of the present invention processes FILE SEND CONTROL commands listed in FIG. 2. The camera storage subunit 104 also manages a file system of the storage 103.

In response to a command from the controller 1043, the selector 1041 supplies one of the file converter 1042 and the digital interface 105 with one of a still image file and a moving image file read out from the storage 103.

In the case where a still image file is supplied to the converter 1042, the file converter 1042 converts the still image file read out from the storage 103 to a desired resolution or image quality requested by the controller 1043; for example, the converter 1042 converts a still image file (such as a JPEG-2000 file) so as to have a resolution progressive function (a function of converting the resolution of the still image in a stepwise fashion) or an image quality progressive function (a function of converting the image quality of the still image in a stepwise fashion).

The controller 1043 includes a memory for $M_1$ storing a control program for controlling a variety of functions of the camera storage subunit 104 and a microcomputer $\mu C_1$ that carries out the control program.

The memory 1044 stores a physical volume number, a logical volume number, and a media generation count of the storage 103. The media generation count stored by the memory 1044 is updated each time the storage 103 is replaced with another storage block.

The digital interface 105 complies with the IEEE1394-1995 standards or extended versions thereof. The digital interface 105 processes FCP (Function Control Protocol) standardized in the IEC61883-1 standard. The FCP is a communication protocol for transmitting a FILE SEND CONTROL command and a response therefore. The digital interface 105 processes the AV/C Asynchronous Serial Bus Connections formulated by the 1394 Trade Association. The AV/C Asynchronous Serial Bus Connections are a communication protocol that uses an asynchronous transmission method defined in the IEEE1394-1995 standard and is appropriate for transmission and reception of a file.

The digital interface 105 and the digital interface 201 transmit and receive a file, which the CSS controller 202 requests the camera storage subunit 104 to send, in accordance with the AV/C Asynchronous Serial Bus Connections.

The digital interface 201 has substantially the same functions as the digital interface 105. In other words, the digital interface 201 handles a communication protocol such as the FCP, the AV/C Asynchronous Serial Bus Connections, etc.

In addition to the functions defined in the AV/C Asynchronous Storage Subunit 1.0 standard, the CSS controller 202 generates the FILE SEND CONTROL commands listed in FIG. 2. The controller 2021 includes a memory $M_2$ for storing a control program for controlling a variety of functions of the CSS controller 202, and a microcomputer $\mu C_2$ for carrying out the control program.

The memory 2022 stores a physical volume number, a logical volume number, and a media generation count of the storage 103. The media generation count stored in the memory 2022 is updated each time the memory 2022 queries the camera storage subunit 104 about the media generation count.

The storage 203 stores, in a predetermined medium, the still image file or the moving image file transmitted from the digital video camera 100 to the external device 200.

FIG. 2 lists command formats of SEND FILE CONTROL commands and response formats of responses therefore in accordance with one embodiment of the present invention.

The SEND FILE CONTROL commands of this embodiment are discussed below with reference to the command formats shown in FIG. 2. The SEND FILE CONTROL commands are generated by the CSS controller 202, and sent to the camera storage subunit 104 via digital interface 201 and digital interface 105.

In the command format, $50_{16}$ is stored in an opcode. Operand [0] is a subfunction field for storing subfunction data. The subfunction data represents an operation mode of a SEND FILE CONTROL command. The operation modes include execute, abort, and resume. The execute mode is a mode requesting execution of a SEND FILE CONTROL command. The abort mode is a mode requesting that execution of a SEND FILE CONTROL command currently in progress be aborted. The resume mode is a mode requesting resumption of a process that has been aborted by a bus reset that is defined in the IEEE1394-1995 standard and extended standards thereof.

Operand [1], and operand [5] to operand [8] store $FF_{16}$, respectively. Operand [2] is a physical_volume_number field for storing a physical volume number. The physical volume number is a number indicating a physical volume where a file requested by the CSS controller 202 is stored.

Operand [3] is a logical_volume_number field for storing a logical volume number. The logical volume number is a number indicating a logical volume where a file requested by the CSS controller 202 is stored.

Operand [4] is a media_generation_count field for storing a media generation count held by the CSS controller 202. The media generation count indicates whether or not the storage 103 is replaced with another storage block.

Operand [9] is a source_plug field for storing a subunit source plug number of a subunit source plug requested by the CSS controller 202.

Operand [10] is a file_type field for storing a file type of a file requested by the CSS controller 202. FIG. 3 shows examples of file type data stored in the file_type field.

Operand [11] is a file_type_specific_info field. The four most significant bits of the file_type_specific_info field are a scalability_type field, and the four least significant bits thereof are a scalability_value field. The scalability_type field stores scalability type data indicating the type of scalability. FIG. 4 shows examples of scalability types and data types. If the scalability type is a spatial resolution, the scalability type data is $0_{16}$. If the scalability type is an image quality, the scalability type data is $1_{16}$. The scalability_value field stores a scalability value indicating a level of the scalability. If a still image file having a size of 1/M (M is an integer equal to or greater than 1) is requested, the scalability value is M. If a still image file having an image quality of 1/N (N is an integer equal to or greater than 1) is requested, the scalability value is N.

Operand [12] is a file_path_length field for storing the data size (a unit thereof is a byte) of a file_path field to be discussed later. Operand [13] and subsequent operands are file_path fields for storing path names of files requested by the CSS controller 202.

With reference to a response format shown in FIG. 2, a SEND FILE CONTROL response corresponding to a SEND FILE CONTROL command in accordance with the present invention will be discussed below.

The SEND FILE CONTROL responses include an ACCEPTED response, a REJECTED response, and an INTERIM response. The ACCEPTED response is a response that indicates that a process in response to a SEND FILE CONTROL command has been successfully completed. The REJECTED response is a response that indicates that a SEND FILE CONTROL command is rejected for a predetermined reason. The INTERIM response is a response that indicates a SEND FILE CONTROL command has been accepted.

The opcode, operand [0], operand [2], operand [3], and operand [5] and operands subsequent thereto store the same value as that for the SEND FILE CONTROL command.

Operand [1] is a result field for storing a result code. In the case of an ACCEPTED response, the result code indicates that the SEND FILE CONTROL command has been successfully completed. In the case of a REJECTED response, the result code indicates the reason why the SEND FILE CONTROL command has been rejected.

Operand [4] is a media_generation_count field for storing a media generation count stored by the memory 1044.

Figure 5:
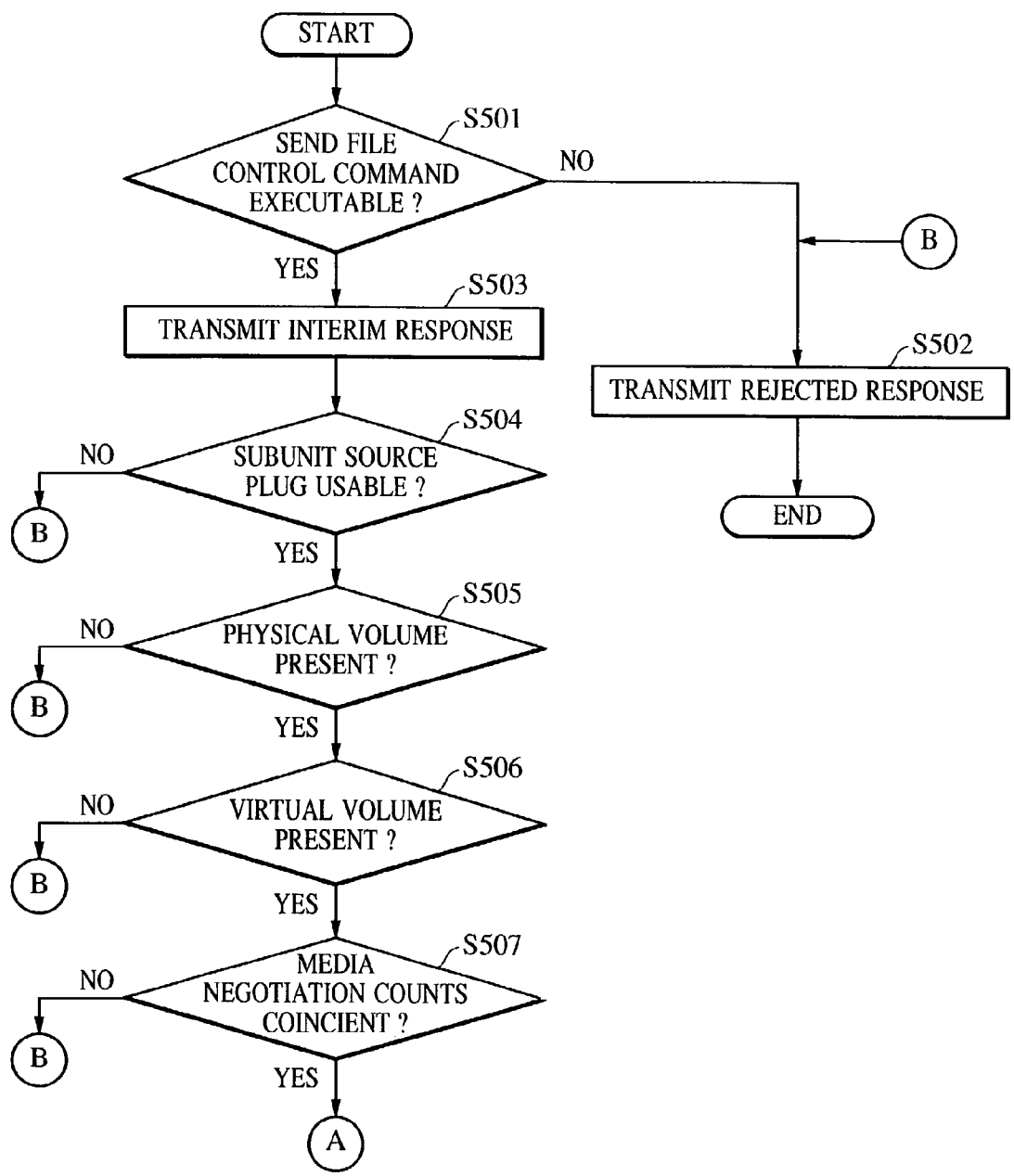
FIG. 5 is a flow diagram showing a part of an operation process of the digital video camera of the embodiment of the present invention.

FIGS. 5 and 6 are flow diagrams illustrating the process of the digital video camera 100. The process illustrated in FIGS. 5 and 6 is carried out each time the digital video camera 100 receives a SEND FILE CONTROL command shown in FIG. 2.

In step S501, the digital interface 105 supplies the controller 1043 with a received SEND FILE CONTROL command. The controller 1043 determines whether or not the SEND FILE CONTROL command is executable. If the controller 1043 determines that the SEND FILE CONTROL command is executable, the controller 1043 performs a process in step S503; otherwise, the controller 1043 performs a process in step S502.

In step S502, the controller 1043 generates a REJECTED response. The digital interface 105 transmits the REJECTED response generated in the controller 1043 to the external device 200.

In step S503, the controller 1043 generates an INTERIM response. The digital interface 105 transmits the INTERIM response generated in the controller 1043 to the external device 200.

In step S504, the controller 1043 detects a subunit source plug number requested by the CSS controller 202 from the SEND FILE CONTROL command, and determines whether a subunit source plug corresponding to the detected source plug number is usable. If it is determined that the subunit source plug is usable, the controller 1043 performs a process in step S505; otherwise, the controller 1043 performs the process in step S502.

In step S505, the controller 1043 detects a physical volume number requested by the CSS controller 202 from the SEND FILE CONTROL command, and determines whether a physical volume corresponding to the detected volume number is present. If it is determined that the physical volume is present, the controller 1043 performs a process in step S506; otherwise, the controller 1043 performs the process in step S502.

In step S506, the controller 1043 detects a logical volume number requested by the CSS controller 202 from the SEND FILE CONTROL command, and determines whether a logical volume corresponding to the detected volume number is present. If it is determined that the logical volume is present, the controller 1043 performs a process in step S507; otherwise, the controller 1043 performs the process in step S502.

In step S507, the controller 1043 detects a media generation count from the SEND FILE CONTROL command, and compares the detected media generation count with a media generation count held by the memory 1044. If it is determined that the storage 103 is not replaced with another storage block, the result of the comparison is a match. The controller 1043 determines that the SEND FILE CONTROL command is effective, and performs a process in step S508. If it is determined that the storage 103 is replaced with another storage block, the result of the comparison is a non-match. The controller 1043 determines that the SEND FILE CONTROL command is an invalid command, and performs the process in step S502.

In step S508, the controller 1043 detects a path name from the SEND FILE CONTROL command, and determines whether a file indicated by the path name is present. If it is determined that the file is present, the controller 1043 performs a process in step S509; otherwise, the controller 1043 performs the process in step S502.

In step S509, the controller 1043 detects a file type requested by the CSS controller 202 from the SEND FILE CONTROL command. If the file type is the JPEG-2000 format, the controller 1043 performs a process in step S511. If the file type is not the JPEG-2000 format, the controller 1043 performs a process in step S510.

In step S510, the selector 1041 feeds the still image file requested by the CSS controller 202 to the digital interface 105. The digital interface 105 transmits the still image file supplied by the camera storage subunit 104 to the external device 200. The external device 200 acquires the desired still image file from the digital video camera 100 by simply transmitting a single control command to the digital video camera 100. When the file transmission to the external device 200 is completed, the controller 1043 performs a process in step S516.

In step S511, the camera storage subunit 104 detects a scalability type requested by the CSS controller 202 from the SEND FILE CONTROL command. If the scalability type requested by the CSS controller 202 is a resolution, the camera storage subunit 104 performs a process in step S512. If the scalability type requested by the CSS controller 202 is an image quality, the camera storage subunit 104 performs a process in step S514.

In step S512, the controller 1043 detects a scalability value requested by the CSS controller 202 from the SEND FILE CONTROL command. The selector 1041 feeds a still image file requested by the CSS controller 202 to the file converter 1042. If the scalability value requested by the CSS controller 202 is M (M is an integer equal to or greater than 1), the file converter 1042 converts the picture size of the JPEG-2000 file requested by the CSS controller 202 into 1/M.

In step S513, the digital interface 105 transmits the JPEG-2000 file having the picture size of 1/M to the external device 200. As a result, the external device 200 acquires a JPEG-2000 file having a desired resolution from the digital video camera 100 by simply transmitting a single control command to the digital video camera 100. Subsequent to the transmission of the JPEG-2000 file to the external device 200, the controller 1043 performs the process in step S516.

In step S514, the controller 1043 detects a scalability value requested by the CSS controller 202 from the SEND FILE CONTROL command. If the scalability value requested by the CSS controller 202 is N (N is an integer equal to or greater than 1), the file converter 1042 converts an image quality of a JPEG-2000 file requested by the CSS controller 202 into 1/N.

In step S515, the digital interface 105 transmits the JPEG-2000 file having an image quality of 1/N to the external device 200. The external device 200 thus acquires a JPEG-2000 file having a desired image quality from the digital video camera 100 by simply transmitting a single control command to the digital video camera 100. Subsequent to transmission of the JPEG-2000 file to the external device 200, the controller 1043 performs the process in step S516.

In step S516, the controller 1043 generates an ACCEPTED response. The digital interface 105 transmits to the external device 200 the ACCEPTED response generated by the controller 1043.

As described, the digital video camera 100 of this embodiment transmits a JPEG-2000 file having a resolution or an image quality requested by the external device 200 by simply receiving a SEND FILE CONTROL command shown in FIG. 2. The digital video camera 100 of this embodiment transmits to the external device 200 a JPEG-2000 file having a resolution or an image quality requested by the external device 200. The traffic of a transmission line is thus reduced. The load on the external device 200 is also reduced.

The present invention is not limited to the above-referenced embodiment. The present invention may be applied not only to a JPEG-2000 file, but also to a still image file having a function corresponding to a resolution progressive function or an image quality progressive function defined in the JPEG-2000 standards. The present invention may be applied to a digital interface other than a digital interface that complies with the IEEE1394-1995 standard and an extended version thereof, as long as the interface transmits and receives the above-referenced SEND FILE CONTROL commands, responses thereto, and still image files.

Alternate Embodiments

The program code of a software program for carrying out the functions of the preferred embodiments may be loaded in a computer in a system or apparatus connected to a variety of devices so that the devices perform the functions of the above preferred embodiments. The variety of devices operate in accordance with the program code stored in the computer (CPU or MPU) in the system or apparatus. Such embodiments fall within the scope of the present invention.

The program code of the software performs the functions of the preferred embodiment. The program code itself, and means for feeding the program code to the computer, for example, a storage medium for storing the program code, fall within the scope of the present invention. Available as storage media for feeding the program code to a computer are a floppy disk, a hard disk, an optical disk, a magneto-optical disk, a CD-ROM, a magnetic tape, a nonvolatile memory card, ROM and the like.

By executing the program code read by the computer, the functions of the preferred embodiments are performed. Furthermore, the functions of the above preferred embodiments may be performed in cooperation with the OS (operating system) running on the computer or another application software program according to the instruction of the program code.

Such a program code falls within the scope of the present invention.

The program code from the storage medium is read into a memory incorporated in a feature expansion board in the computer or in a feature expansion unit connected to the computer. The CPU mounted on the feature expansion board or the feature expansion unit performs partly or entirely the actual process in response to the instruction from the program code. The functions of the above preferred embodiment are executed through the described process (method steps). Such a program code falls within the scope of the present invention.

The above-described preferred embodiments are merely exemplary of the present invention, and are not be construed to limit the scope of the present invention.

The scope of the present invention is defined by the scope of the appended claims, and is not limited to only the specific descriptions in this specification. Furthermore, all modifications and changes belonging to equivalents of the claims are considered to fall within the scope of the present invention.

What is claimed is:

1. An imaging device for transmitting a still image file, comprising:
    an interface unit which receives, from an external device via a connection between said imaging device and the external device, a control command including first data designating a still image file to be transmitted, second data designating a file type, and third data designating a resolution; and
    a conversion unit which converts the still image file designated by the first data into a still image file having the resolution designated by the third data if the file type designated by the second data is a predetermined file type,
    wherein if the file type designated by the second data is the predetermined file type, said interface unit transmits, to the external device via the connection between said imaging device and the external device, the still image file having the resolution designated by the third data, and
    if the file type designated by the second data is not the predetermined file type, said interface unit transmits, to the external device via the connection between said imaging device and the external device, the still image file at its original resolution.

2. An imaging device according to claim 1, wherein the predetermined file type is a file type corresponding to the JPEG-2000 standard.

3. An imaging device according to claim 1, further composing:
    an imaging unit which captures a still image; and
    a file generator which generates a still image file including still image data corresponding to the still image captured by said imaging unit.

4. An imaging device for transmitting a still image file, composing:
    an interface unit which receives, from an external device via a connection between said imaging device and the external device, a control command including first data designating a still image file to be transmitted, second data designating a file type, and third data designating an image quality; and a conversion unit which converts the still image file designated by the first data into a still image file having the image quality designated by the third data if the file type designated by the second data is a predetermined file type, wherein if the file type designated by the second data is the predetermined file type, said interface unit transmits, to the external device via the connection between said imaging device and the external device, the still image file having the image quality designated by the third data, and if the file type designated by the second data is not the predetermined file type, said interface unit transmits, to the external device via the connection between said imaging device and the external device, the still image file at its original image quality.

5. An imaging device according to claim 4, wherein the predetermined file type is a file type corresponding to the JPEG-2000 standard.

6. An imaging device according to claim 4, further composing:

an imaging unit which captures a still image; and a file generator which generates a still image file including still image data corresponding to the still image captured by said imaging unit.

7. A method of transmitting a still image file from an imaging device to an external device, comprising the steps of:

receiving, from the external device via a connection between the imaging device and the external device, a control command including first data designating a still image file to be transmitted, second data designating a file type, and third data designating a resolution;

if the file type designated by the second data is a predetermined file type, converting the still image file designated by the first data into a still image file having the resolution designated by the third data;

if the file type designated by the second data is the predetermined file type, transmitting, from the imaging device to the external device via the connection between the imaging device and the external device, the still image file having the resolution designated by the third data; and if the file type designated by the second data is not the predetermined file type, transmitting, from the imaging device to the external device via the connection between the imaging device and the external device, the still image file at its original resolution.

8. A method according to claim 7, wherein the predetermined file type is a file type corresponding to the JPEG-2000 standard.

9. A method according to claim 7, wherein the imaging device is capable of capturing a still image, and generating a still image file including still image data corresponding to the captured still image.

10. A method of transmitting a still image file from an imaging device to an external device, comprising the steps of:

receiving, from the external device via a connection between the imaging device and the external device, a control command including first data designating a still image file to be transmitted, second data designating a file type, and third data designating an image quality;

if the file type designated by the second data is a predetermined file type, converting the still image file designated by the first data into a still image file having the image quality designated by the third data;

if the file type designated by the second data is the predetermined file type, transmitting, from the imaging device to the external device via the connection between the imaging device and the external device, the still image file having the image quality designated by the third data; and if the file type designated by the second data is not the predetermined file type, transmitting, from the imaging device to the external device via the connection between the imaging device and the external device, the still image file at its original image quality.

11. A method according to claim 10, wherein the predetermined file type is a file type corresponding to the JPEG-2000 standard.

12. A method according to claim 10, wherein the imaging device is capable of capturing a still image, and generating a still image file including still image data corresponding to the captured still image.

13. An imaging device according to claim 1, wherein after transmitting the still image file to the external device, said imaging device transmits to the external device a response indicating that a process has been successfully completed.

14. An imaging device according to claim 4, wherein after transmitting the still image file to the external device, said imaging device transmits to the external device a response indicating that a process has been successfully completed.

15. A method according to claim 7, further comprising a step of transmitting, after transmitting the still image file to the external device, to the external device a response indicating that a process has been successfully completed.

16. A method according to claim 10, further comprising a step of transmitting, after transmitting the still image file to the external device, to the external device a response indicating that a process has been successfully completed.

* * * * *